March 2, 1954  A. M. LARROWE  2,670,587
LAWN MOWER GRASS CATCHING AND DISCHARGING ATTACHMENT
Filed Feb. 19, 1952  4 Sheets-Sheet 2
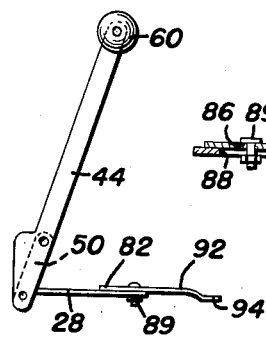
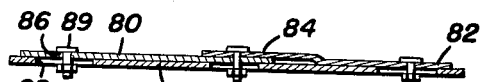
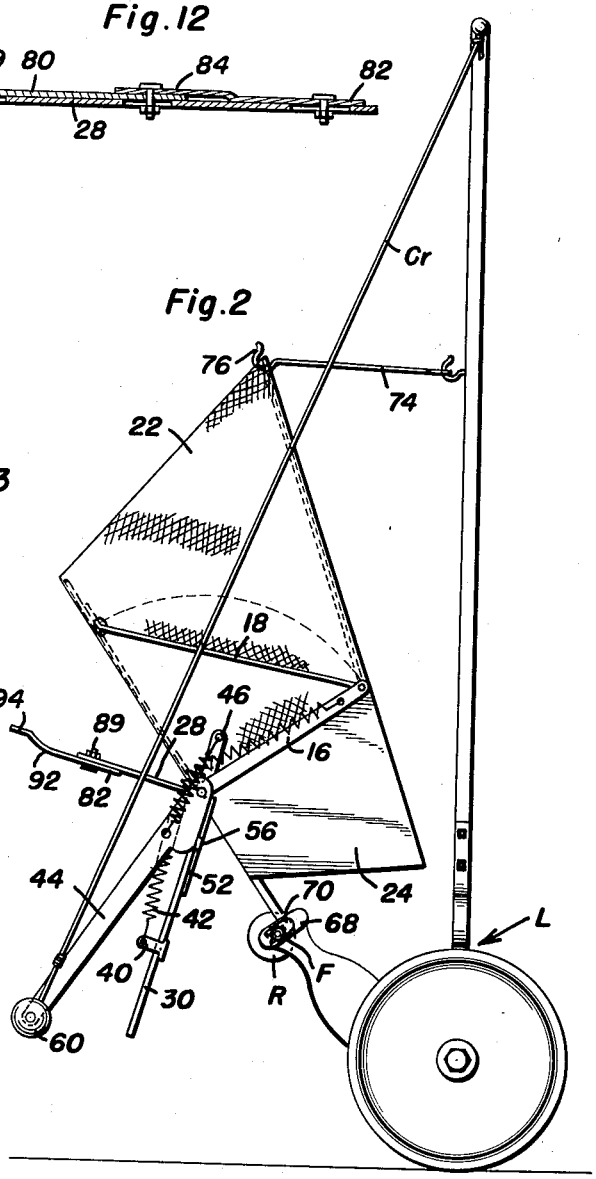
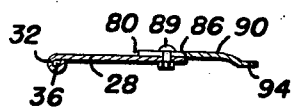
Arthur M. Larrowe
INVENTOR.
BY *[signatures]*
Attorneys March 2, 1954  A. M. LARROWE  2,670,587
LAWN MOWER GRASS CATCHING AND DISCHARGING ATTACHMENT
Filed Feb. 19, 1952  4 Sheets-Sheet 3
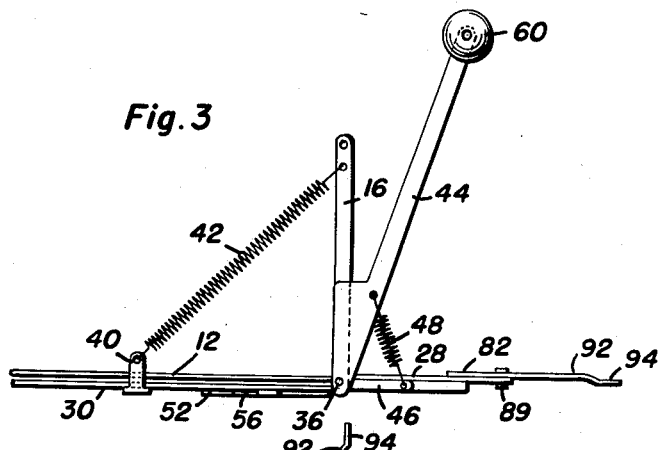
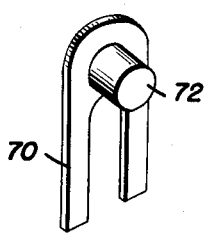
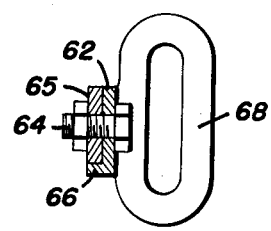
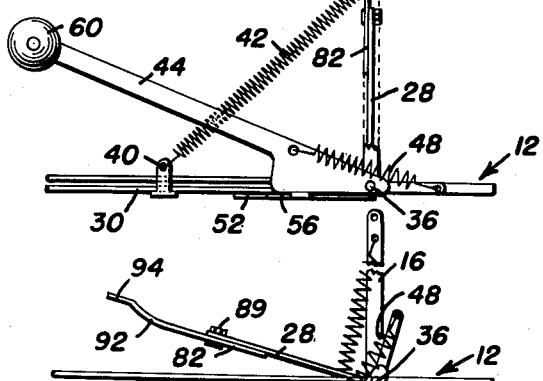
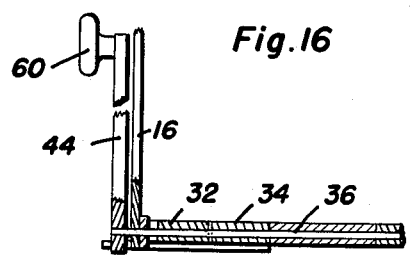
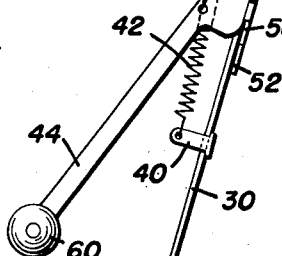
Arthur M. Larrowe
INVENTOR.

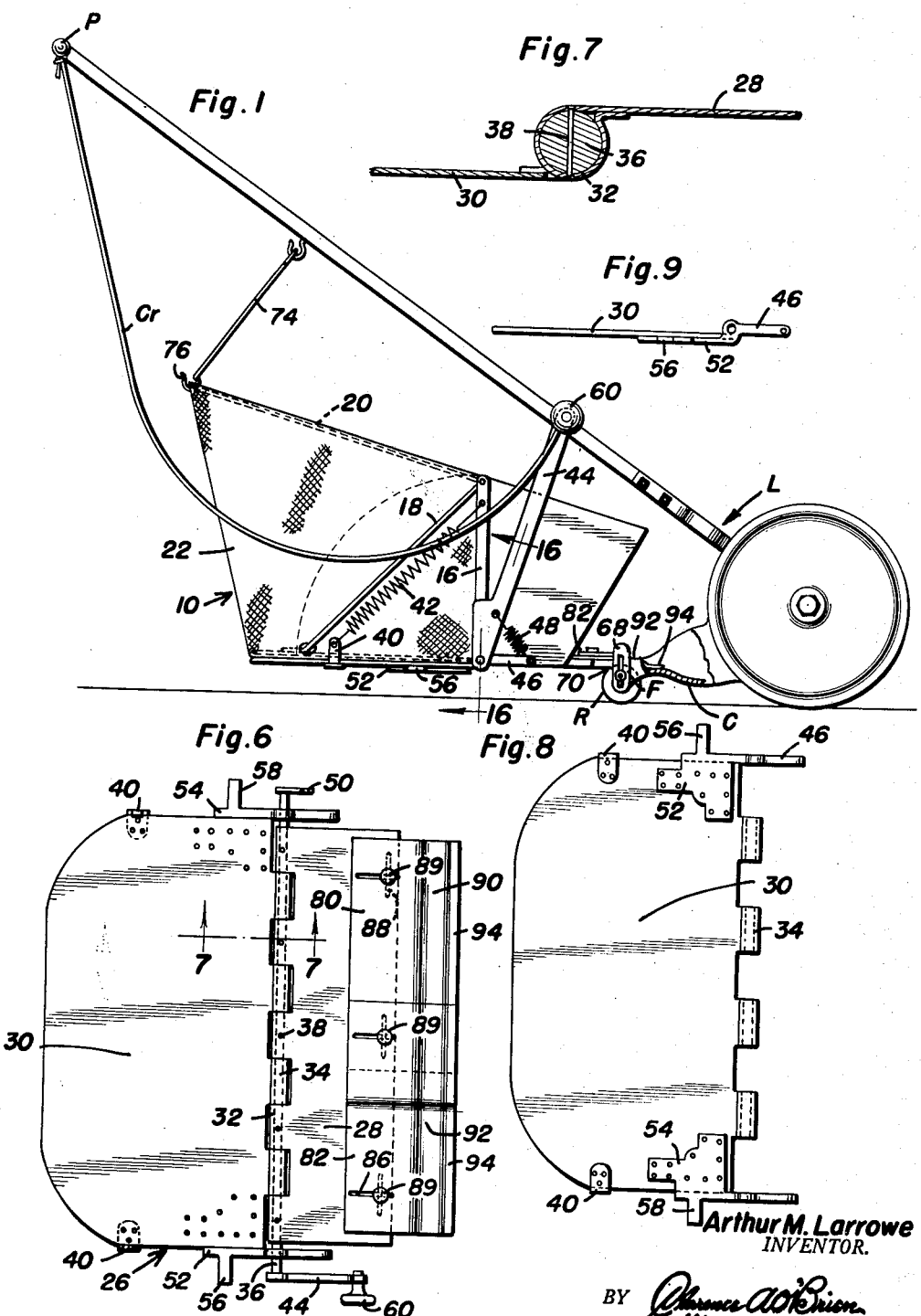

March 2, 1954
A. M. LARROWE
2,670,587
LAWN MOWER GRASS CATCHING AND DISCHARGING ATTACHMENT
Filed Feb. 19, 1952
4 Sheets-Sheet 4
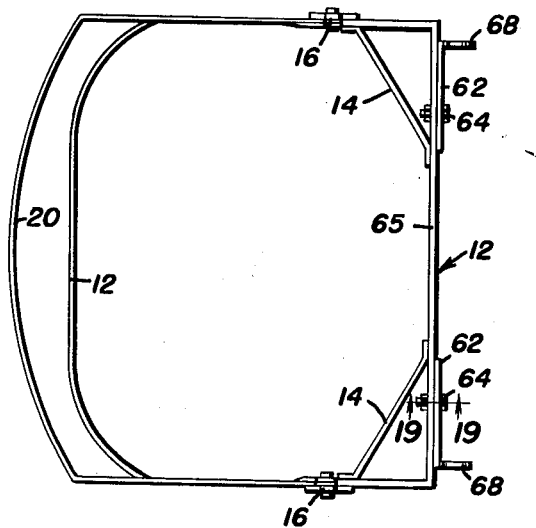
Fig.14
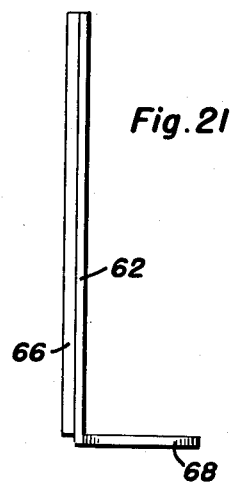
Fig.21
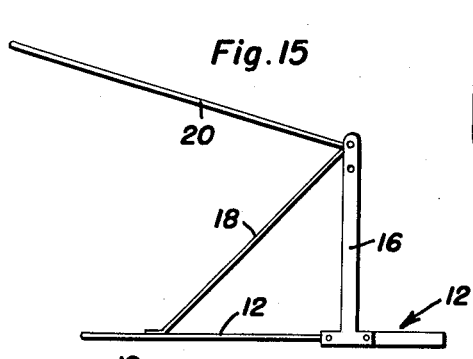
Fig.15
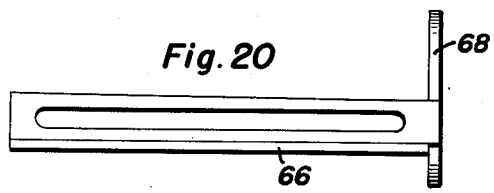
Fig.20
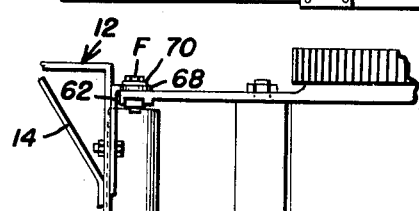
Fig.17
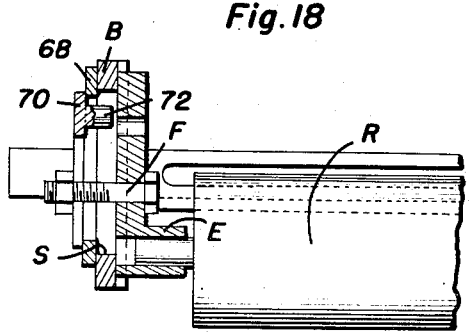
Fig.18
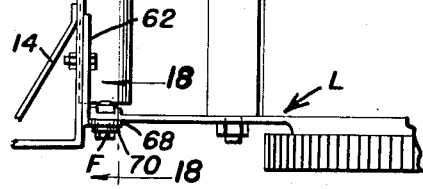
Arthur M. Larrowe
INVENTOR.
BY *Clarence A O'Brien*
*and Harvey B. Jackson*
Attorneys Patented Mar. 2, 1954

2,670,587

UNITED STATES PATENT OFFICE 2,670,587

LAWN MOWER GRASS CATCHING AND DISCHARGING ATTACHMENT

Arthur M. Larrowe, Bellflower, Calif.

Application February 19, 1952, Serial No. 272,408

10 Claims. (Cl. 56—200)

This invention relates to new and useful improvements in grass catching attachments for lawn mowers and the primary object of the present invention is to provide a device mountable upon a conventional lawn mower and adapted to effectively receive and discharge grass cut by the lawn mower.

Another important object of the present invention is to provide a grass catching and dispensing attachment for lawn mowers involving manually actuated means for directing grass onto a vertically swingable bottom wall section that is moved to permit the discharge of the grass received thereon.

A further object of the present invention is to provide a grass catching and discharging attachment for lawn mowers embodying novel and improved means for quickly and readily attaching the same to or removing the attachment from conventional portions of a lawn mower in a convenient manner.

A still further aim of the present invention is to provide a grass catcher of the aforementioned character that is simple and practical in construction, strong and reliable in use, small and compact in structure, efficient and durable in operation, adjustable to lawn mowers of various widths, inexpensive to manufacture, and otherwise well adapted for the purposes for which the same is intended.

Other objects and advantages reside in the details of construction and operation as more fully hereinafter described and claimed, reference being had to the accompanying drawings forming part thereof, wherein like numerals refer to like parts throughout, and in which:

Figure 1 is a side elevational view of a lawn mower and showing the present invention mounted thereon and with parts of the lawn mower broken away and parts in section for the convenience of explanation;

Figure 2 is a view similar to Figure 1 but showing the lawn mower raised and the rear bottom wall section of the attachment lowered to a grass discharging position;

Figure 3 is an enlarged view showing the initial position of the operating lever with the forward and rear bottom wall sections in their normal horizontal positions;

Figure 4 is a view similar to Figure 3 but showing the operating lever moved rearwardly in order to raise the forward bottom wall section, thereby directing grass thereon onto the rear bottom wall section;

Figure 5 is a view following in sequence the views of Figures 3 and 4 and showing the lever moved downwardly and forwardly in order to lower the rear bottom wall section for the discharge of grass therefrom;

Figure 6 is a top plan view of the bottom wall of the grass catching attachment;

Figure 7 is an enlarged detailed sectional view taken substantially on plane of section line 7—7 of Figure 6;

Figure 8 is a bottom plan view of the rear bottom wall section;

Figure 9 is an end view of Figure 8;

Figure 10 is a top plan view of the forward bottom wall section;

Figure 11 is an end view of Figure 10;

Figure 12 is an enlarged longitudinal vertical sectional view taken substantially on the plane of section line 12—12 of Figure 10;

Figure 13 is a transverse vertical sectional view taken substantially on the plane of section line 13—13 of Figure 10;

Figure 14 is a plan view of the frame member forming part of the present invention;

Figure 15 is an end view of Figure 14;

Figure 16 is an enlarged fragmentary detailed sectional view taken substantially on the plane of section line 16—16 of Figure 1;

Figure 17 is a fragmentary top plan view of Figure 1 to illustrate the manner in which the frame member is removably secured to the roller supporting brackets of the lawn mower;

Figure 18 is an enlarged detailed vertical sectional view taken substantially on the plane of section line 18—18 of Figure 17;

Figure 19 is an enlarged detailed vertical sectional view taken substantially on the plane of section line 19—19 of Figure 14;

Figure 20 is an enlarged elevational view of one of the frame mounting arms used in the present invention;

Figure 21 is a plan view of Figure 20; and,

Figure 22 is an enlarged perspective view of the anti-rotation element employed in conjunction with the attaching arms of Figures 20 and 21.

Referring now to the drawings in detail, wherein for the purpose of illustration, there is disclosed a preferred embodiment of the present invention, the numeral 10 represents the grass catching basket member including a substantially rectangular open frame 12 having forward corner braces 14, side upright pieces 16, braces 18 between the upright pieces 16 and rear of the frame and a swingable bail element 20 pivotally attached to the upper ends of the upright pieces 16. A U-shaped flexible wall member 22 is suitably supported on the frame 12 and the bail element 20, and vertical side plates 24 extend forwardly from the wall member 22 and are suitably secured to the frame 12.

A bottom wall 26 is provided for the basket member 10 and includes forward and rear flat rigid sections 28 and 30. The rear longitudinal edge of the section 28 is provided with longitudinally spaced hinge sleeves or knuckles 32 that are interdigitated with longitudinally spaced hinge sleeves or knuckles 34 at the forward longitudinal edge of the rear section. A horizontal pivot or hinge pin 36 extends through the sleeves 32 and 34, and each sleeve 32 is secured to the pin 36 by holding pins 38. The ends of the pin 36 extend through apertures in the lower ends of the upright pieces 16.

Rear section 30 underlies the frame 12 so that it may swing downwardly and forwardly, whereas forward section 28 overlies the frame 12 so that it may swing upwardly and rearwardly. Section 30 supports anchoring ears 40 at its rear side edges that are connected to the upper portions of the upright pieces 16 by coil springs 42. The springs 42 yieldingly retain the section 30 against the frame 12 and in a substantially horizontal position.

The lower end of a vertically swingable lever 44 is secured to one end of the pivot 36 to permit raising of the forward section by the lever 44. The lower portion of the lever 44 is connected to a rigid arm 46, fixed to and projecting forwardly from the section 30, by a coil spring 48 that urges the lever 44 to a substantially vertically inclined position. A contact arm 50 is fixed to the other end of the pivot 36 and parallels the lever 44.

Plates 52 and 54 are secured to the undersurface of section 30 and carry outwardly projecting abutment arms 56 and 58 that are disposed in the path of the lever 44 and contact arm 50 respectively, so that as the lever 44 is rotated anticlockwise, the rear section 30 will be swung downwardly against action of springs 42. A hand gripping knob 60 is secured to the upper end of the lever 44, whereby the same may be swung or rotated.

Means is provided for removably securing the basket member 10 to a lawn mower L. This means comprises a pair of longitudinally slotted arms 62 that are slidably adjustably secured to the forward frame part 65 by fasteners 64. The arms 62 are provided with longitudinal flanges 66 that engage the lower edge of part 65 to aid in preventing rotation of the arms on their fasteners.

Eye elements or rings 68 are fixed to the outer ends of the arms 62 and overlap the roller supporting brackets B of the lawn mower as shown best in Figure 13. The brackets B being conventional, carry bearing elements E through the medium of bolts F. In order to prevent rotation of the arms 62 or eyes 68 on the bolts F, a yoke element 70 (see Figure 22) is associated with each ring. The yoke elements 70 rest against the outer faces of the rings 68 and are provided with laterally projecting lugs 72 that extend through the openings in the rings 68 and into the bolt receiving slots S of the brackets B.

A hanger 74 depends from the handle of the lawn mower and includes a hook portion 76 that extends under the bail element 20 and through the wall member 22 to hold the bail element 20 raised and the wall member 22 extended. The lower portion of the wall member 22 is releasably secured to the rear portion of the frame by suitable means.

Means is provided for bridging the gap or space between the forward bottom wall section 28 and the rear cutter C of the lawn mower. This means comprises a pair of elongated plate members 80 and 82 that overlie the wall section 28. As shown best in Figure 12, the inner offset end 84 of the plate member 82 overlaps the inner end of the plate member 80. The ends of the plate members 80 and 82 are provided with transverse slots 86 that register with longitudinal slots 88 in section 28, and fasteners 89 extend through registering slots to permit the plate members 80 and 82 to be longitudinally adjusted relative to each other and such construction also permits lateral adjustment of the plate members 80 and 82 relative to the section 28 while the plate members remain parallel to the section 28.

Channels 90 and 92 are formed with and extend forwardly from the plate members 80 and 82. The inner end of channel 92 is offset to overlap the inner end of the channel 90, and both channels rest upon the roller R of the lawn mower and include flat forward flanges 94 that rest upon the rear edge of the cutter C, as shown in Figure 1.

In practical use of the present invention, an operating cord Cr is attached at one end to the lever 44 or to the knob 60 carried thereby. The other end of the cord extends to the hand gripping portion P of the lawn mower L so a user may conveniently grasp the cord in order to impart swinging motion to the lever 44.

As the lawn mower is moved forwardly, during its normal cutting operation, the grass cut by the lawn mower will be directed rearwardly onto the forward bottom wall section 28. Periodically, the cord is pulled rearwardly to swing the lever 44 rearwardly, thereby raising or swinging upwardly and rearwardly, the section 28 in order that grass on the section 28 may be directed onto the bottom wall of section 30.

When the basket member 10 has been filled, to a predetermined amount, with grass, the lawn mower may be tipped clockwise, the lever 44 may then be swung rearwardly and then downwardly and forwardly so that the lever 44 and arm 50 will engage the contact arms 56 and 58 to swing the section 30 downwardly and permit grass within the basket element to be discharged therefrom. During this operation, the bottom wall 28 will be substantially perpendicular to the wall section 30 in order to prevent grass from dropping downwardly from the forward portion of the basket element 22.

When the lever 44 is released, the spring 42 will return the bottom wall 30 to its position against the undersurface of the frame 12, and the spring 48 will return the wall section 28 to its position against the upper surface of the forward portion of the frame 12, thereby establishing the normal position of the bottom 30 and 28.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A grass catching attachment for lawn mowers comprising a basket member adapted to be supported upon a lawn mower, said basket member including a bottom wall having forward and rear rigid sections and a hinge pin pivotally connecting said sections together for vertical swinging movement, an operating lever fixedly mounted on said hinge pin for vertical swinging movement, means securing said hinge pin to said forward section whereby said lever may be employed for raising the forward section to force grass on the forward section onto the rear section, and means carried by the rear section and engageable with the lever to swing the rear section downwardly to dispense grass from the basket member.

2. A grass catching attachment for lawn mowers comprising a basket member adapted to be supported upon a lawn mower, said basket member including a bottom wall having forward and rear rigid sections, pivot means connecting the sections, said forward section being swingable upwardly and rearwardly and said rear section being swingable downwardly and forwardly on said pivot means, a vertically swingable operating lever attached to said pivot means and connected to said forward section for raising the forward section as the lever is pulled rearwardly, and means carried by the rear section engageable by the lever as the lever is swung rearwardly and downwardly to force the rear section downwardly.

3. A grass catching and dispensing attachment for lawn mowers comprising a basket member including a bottom wall having forward and rear rigid sections, a pivot pin pivotally connecting said sections together for vertical swinging movement and being secured to said forward section, said sections normally being horizontal, said forward section being swingable upwardly and rearwardly to direct grass thereon onto the rear section and said rear section being swingable downwardly and forwardly on said pivot pin to permit grass on the rear section to pass therefrom, a vertically swingable operator connected to the pivot pin and swingable rearwardly to raise the forward section, and means carried by the rear section for engaging the operator to permit lowering of the rear section on said pivot pin as the operator is swung rearwardly and downwardly.

4. A grass catching and dispensing attachment for lawn mowers comprising a basket member including a bottom wall having forward and rear rigid sections, a pivot pin pivotally connecting said sections together for vertical swinging movement and being fixed to said forward section, said sections normally being horizontal, said forward section being swingable upwardly and rearwardly to direct grass thereon onto the rear section and said rear section being swingable downwardly and forwardly on said pivot pin to permit grass on the rear section to pass therefrom, and a rotatable member fixed to the pivot pin for sequentially raising the forward section and lowering the rear section as the rotatable member is rotated counterclockwise.

5. A grass catching and dispensing attachment for lawn mowers comprising a basket member including a bottom wall having forward and rear rigid sections, a pivot pin pivotally connecting said sections together for vertical swinging movement, said sections normally being horizontal, said forward section being fixed to said pivot pin and swingable upwardly and rearwardly to direct grass thereon onto the rear section and said rear section being swingable downwardly and forwardly on said pivot pin to permit grass on the rear section to pass therefrom, a horizontal arm attached to and projecting outwardly from the rear section, and a rotatable member fixedly connected to the pivot pin and rotatable clockwise and anti-clockwise, said rotatable member being rotated anti-clockwise to sequentially raise the forward section and engage the arm to lower the rear section as the rotatable member is rotated anti-clockwise.

6. The combination of claim 1 and means carried by and extending forwardly of the forward section adapted to engage and overlie the roller of a lawn mower to bridge the gap between the bottom wall and the mower.

7. The combination of claim 6 wherein said means includes a plate slidably adjustably secured to the forward section, and a roller embracing channel formed with the plate and extending in spaced parallel relationship to the forward section and forwardly of the latter.

8. In a lawn mower having roller holding brackets, a grass catching and dispensing attachment member comprising a basket holding frame, means carried by the frame removably securing the frame to the roller holding brackets of the lawn mower, a bottom wall including forward and rear vertically swingable sections carried by the frame, said sections normally being horizontally disposed, said forward section being raised to direct grass thereon onto the rear section and said rear section being lowered to effect a discharge of grass therefrom, and means connected to the forward section for sequentially raising the forward section and lowering the rear section.

9. In a lawn mower having roller holding brackets, a grass catching and dispensing attachment member comprising a basket holding frame, means carried by the frame removably securing the frame to the roller holding brackets of the lawn mower, a bottom wall including forward and rear vertically swingable sections carried by the frame, said sections normally being horizontally disposed, said forward section being raised to direct grass thereon onto the rear section and said rear section being lowered to effect a discharge of grass therefrom, and means connected to the forward section for sequentially raising the forward section and lowering the rear section, said means for removably securing the frame to the roller holding brackets of the lawn mower including a pair of arms slidably and adjustably secured to the frame, and ring elements fixed to and projecting laterally from the arms.

10. A grass catching and dispensing attachment for lawn mowers comprising a frame having means for attaching the same to a lawn mower, a horizontal pivot carried by the frame, a forward bottom wall section having a rear edge secured to said pivot, a rear bottom wall section having a forward edge rotatable on the pivot, a plate secured to the forward section and having a channel shaped portion paralleling the pivot and disposed forwardly of the forward section for resting upon the cutter of a lawn mower, a lever fixed to one end of the pivot for raising the forward section to direct grass on the forward section onto the rear section, and an arm carried by the rear section and disposed in the path of the lever, whereby lowering of the rear section by the arm may be accomplished in order to discharge grass from the rear section.

ARTHUR M. LARROWE.

References Cited in the file of this patent

UNITED STATES PATENTS

| Number | Name | Date |
|---|---|---|
| 46,169 | Wolf | Jan. 31, 1865 |
| 1,669,471 | Jones | May 15, 1928 |
| 2,148,825 | Lowther | Feb. 28, 1939 |